(12) United States Patent
Taniguchi et al.

(10) Patent No.: US 8,994,647 B2
(45) Date of Patent: Mar. 31, 2015

(54) INPUT DEVICE, WEARABLE COMPUTER, AND INPUT METHOD

(75) Inventors: Kazuhiro Taniguchi, Suita (JP); Atsushi Nishikawa, Suita (JP); Fumio Miyazaki, Suita (JP); Asako Kokubo, Tokyo (JP)

(73) Assignee: ERCC Co., Ltd., Hiroshima (JP)

( * ) Notice: Subject to any disclaimer, the term of this patent is extended or adjusted under 35 U.S.C. 154(b) by 892 days.

(21) Appl. No.: 13/147,919

(22) PCT Filed: Feb. 2, 2010

(86) PCT No.: PCT/JP2010/051397
§ 371 (c)(1),
(2), (4) Date: Sep. 22, 2011

(87) PCT Pub. No.: WO2010/090175
PCT Pub. Date: Aug. 12, 2010

(65) Prior Publication Data
US 2012/0001846 A1 Jan. 5, 2012

(30) Foreign Application Priority Data

Feb. 5, 2009 (JP) ................................. 2009-024889

(51) Int. Cl.
*G09G 5/00* (2006.01)
*G06F 3/01* (2006.01)
*G06F 1/16* (2006.01)

(52) U.S. Cl.
CPC ................ *G06F 3/011* (2013.01); *G06F 1/163* (2013.01)
USPC ............................ 345/156; 345/158; 345/207

(58) Field of Classification Search
CPC .................................. H04R 1/10; H04R 25/00
USPC ................................... 345/7–9, 156–158, 207
See application file for complete search history.

(56) References Cited

U.S. PATENT DOCUMENTS

2006/0215847 A1 9/2006 Hollemans
2007/0003084 A1* 1/2007 Huynh et al. ................. 381/323
(Continued)

FOREIGN PATENT DOCUMENTS

CN 1618400 A 5/2005
JP 7-171136 A 7/1995
(Continued)

OTHER PUBLICATIONS

Taniguchi, K. et al. Komekami Switch: A Novel Wearable Input Device Using Movement of Temple. In: Journal of Robotics and Mechatronics vol. 20 (2); 2008; pp. 260-272.
(Continued)

*Primary Examiner* — Kimnhung Nguyen
(74) *Attorney, Agent, or Firm* — Pearne & Gordon LLP

(57) ABSTRACT

A low-cost input device suitable for a wearable computer is provided. An input method suitable for operating a wearable computer is provided. A wearable computer including the input device is provided. An input device 100 for outputting a control command γ to an external output device 40 includes a sensor 10 configured to be worn in or on a natural orifice of the body and sense a change in a shape of the natural orifice, and a controller 20 configured to control the external output device 40 based on a sensor signal α from the sensor 10. Here, the change in the shape of the natural orifice is caused by a predetermined action which is performed by a user wearing the sensor 10 with the intention of operating the external output device 40.

13 Claims, 12 Drawing Sheets

(56) References Cited

U.S. PATENT DOCUMENTS

| | | | |
|---|---|---|---|
| 2008/0013769 A1* | 1/2008 | Sacha et al. | 381/345 |
| 2008/0132750 A1* | 6/2008 | Miller | 600/25 |
| 2008/0199030 A1* | 8/2008 | Sacha et al. | 381/315 |
| 2008/0253579 A1* | 10/2008 | Cronin et al. | 381/60 |
| 2009/0154742 A1* | 6/2009 | Rasmussen | 381/312 |
| 2009/0169039 A1* | 7/2009 | Rasmussen et al. | 381/322 |
| 2010/0069705 A1* | 3/2010 | Schumaier | 600/25 |

FOREIGN PATENT DOCUMENTS

| | | | |
|---|---|---|---|
| JP | 7-213510 A | 8/1995 | |
| JP | 11-318862 A | 11/1999 | |
| JP | 2002-44791 A | 2/2002 | |
| JP | 2007-011627 A | 1/2007 | |
| JP | 2008-229355 A | 10/2008 | |
| JP | 2008-304451 A | 12/2008 | |

OTHER PUBLICATIONS

International Search Report for PCT/JP2010/051397; Apr. 13, 2010.
First Office Action issued in corresponding Chinese Patent Application No. 201080006375.9 dated Jun. 5, 2013.
Second Office Action issued in corresponding Chinese Patent Application No. 201080006375.9 dated Jan. 24, 2014.
Third Office Action issued in corresponding Chinese Patent Application No. 201080006375.9 dated Jul. 21, 2014.
Japanese Office action of application No. 2010-549468 dated Apr. 11, 2013.

* cited by examiner (a)

(b)

INPUT DEVICE, WEARABLE COMPUTER, AND INPUT METHOD

TECHNICAL FIELD

The present invention relates to input devices for outputting a control command or commands to an external output device or devices, wearable computers including the input devices, and input methods for outputting a control command or commands to an external output device or devices.

BACKGROUND ART

In recent years, wearable computers, which are worn on the body to allow hands-free operation, have been developed in a variety of fields. The recent progress of semiconductor technology and communications technology has allowed wearable computers to utilize a network as a means for computation and storage which were previously performed by the wearable computers themselves. Therefore, a main function of wearable computers which will be required in the future is one that relates to human-machine interface (i.e., an input device and an output device). As the output device, some head-mounted displays or bone conduction headphones have already been developed, for example. However, no low-cost input device which is suitably used in wearable computers has been developed yet.

On the other hand, although it is not used as an input device for wearable computers, there is a device for measuring the number of chewing cycles in human mastication (see, for example, Patent Documents 1-3). This device can acquire information in a hands-free manner.

When a human chews food etc., the movement of the jaw is accompanied by the movement of muscles around the ear canal. Therefore, in the device of Patent Document 1, a pressure sensor is inserted in the ear canal to sense a change in pressure in the ear canal which is caused by the muscle movement, thereby measuring the number of pressure changes as the number of chewing cycles.

Patent Document 2 is based on a principle similar to that of Patent Document 1. Patent Document 2 describes a low pressure sensor, a piezoelectric sensor, and a press sensor which are used as a pressure sensor to sense a movement of the ear canal associated with mastication.

Patent Document 3 is also basically based on a principle similar to that of Patent Documents 1 and 2. Patent Document 3 describes a sensor which senses a movement derived from mastication, and also describes, as examples of the sensor, a tension sensor, an electromyography sensor, and a pressure sensor.

CITATION LIST

Patent Documents

Patent Document 1: Japanese Patent Application Publication No. H07-213510
Patent Document 2: Japanese Patent Application Publication No. H11-318862
Patent Document 3: Japanese Patent Application Publication No. H07-171136

SUMMARY OF THE INVENTION

Technical Problem

As described above, however, Patent Documents 1-3 do not teach or suggest that their devices are used as an input device for wearable computers. Although it is contemplated that the devices of Patent Documents 1-3 may be used as an input device for a wearable computer, the result of sensing a change in pressure in the ear canal by the devices of Patent Documents 1-3 is likely to vary depending on the use environment (the size or shape of the ear canal, the attached state, etc.), and therefore, the devices of Patent Documents 1-3 are not suitable for an input device for wearable computers, for which accurate operations are required.

In order to reliably sense a change in pressure in the ear canal, a pressure sensor needs to be firmly fitted into a wearer's ear canal by pressing. This is, however, uncomfortable for the wearer. Therefore, it is difficult to wear the sensor for a long time. Also in this regard, the devices of Patent Documents 1-3 are not suitable for an input device for wearable computers.

Note that the cost of the devices of Patent Documents 1-3 which employ a pressure sensor is relatively high, and the structure tends to become complicated. Therefore, there is a demand for development of a lower-cost and simpler input device.

The present invention has been made in view of the above problems. It is an object of the present invention to provide a low-cost input device suitable for wearable computers. It is another object of the present invention to provide an input method suitable for operating wearable computers. It is still another object of the present invention to provide a wearable computer including the input device.

Solution to the Problem

In order to achieve the object, an input device according to the present invention is an input device for outputting a control command or commands to an external output device or devices, including a sensor configured to be worn in or on a natural orifice of the body and sense a change in a shape of the natural orifice, and a controller configured to control the external output device or devices based on a sensor signal or signals from the sensor.

According to the input device having this configuration, the sensor is worn in or on the natural orifice of the body, and therefore, the change in the shape of the natural orifice can be sensed under an environment where external disturbing factors, such as external light etc., are eliminated to the extent possible. As a result, a highly reliable sensor signal is stably obtained from the sensor. Based on the obtained sensor signal, the external output device or devices can be controlled with high accuracy.

In the input device of the present invention, the sensor preferably includes an optical sensor or an acoustic sensor.

According to the input device having this configuration, an optical sensor or an acoustic sensor is employed, and therefore, for example, it is not necessary to fit the sensor itself into the natural orifice of the body by strongly pressing, as is different from a pressure sensor. Therefore, it is possible to reduce a user's discomfort when he or she wears the input device. As a result, it is possible to wear the input device for a long time, and therefore, the input device can be preferably used in wearable computers.

Also, when an optical sensor is worn in or on the natural orifice of the body, in particular the influence of external light as an external disturbing factor can be satisfactorily eliminated, whereby the reliability and stability of the input device can be further improved.

Moreover, when an optical sensor is employed, the structure of the input device can be simplified compared to a pressure sensor etc., and in addition, the cost of the input device can be further reduced.

In the input device of the present invention, the optical sensor is preferably a reflective photosensor or an FGB optical fiber sensor, and the acoustic sensor is preferably an ultrasonic distance sensor. If these existing sensors are employed as the sensor included in the input device of the present invention, a lower-cost input device can be provided.

In the input device of the present invention, the change in the shape of the natural orifice is preferably caused by a predetermined action which is performed by a user wearing the sensor with the intention of operating the external output device or devices.

According to the input device having this configuration, if a user wearing the sensor only performs a predetermined action with the intention of operating the external output device or devices, the sensor senses the change in the shape of the natural orifice to generate a sensor signal or signals.

Thus, according to this configuration, it is possible to construct an input device, which controls an external output device or devices in response to the intention of a user wearing the sensor.

In the input device of the present invention, the continuous change in the shape of the natural orifice is preferably caused by a predetermined continuous action which is performed by a user wearing the sensor with the intention of continuously operating the external output device or devices.

According to the input device having this configuration, if a user wearing the sensor only performs a predetermined continuous action, the external output device or devices are continuously operated, and therefore, the wearer's convenience of operation can be further improved.

In the input device of the present invention, the natural orifice is preferably an outer ear including an ear canal, and the predetermined action is preferably at least one selected from the group consisting of an action of blinking an eyelid, an action of moving an eyeball, an action of moving a tongue, a masticating action, an action of expanding and contracting a face, and combinations thereof.

If a user performs at least one selected from the group consisting of an action of blinking an eyelid, an action of moving an eyeball, an action of moving a tongue, a masticating action, an action of expanding and contracting a face, and combinations thereof, the shape of the outer ear (including the ear canal) as the natural orifice is changed. Therefore, in the input device having this configuration, a control command or commands to control the external output device or devices are generated by sensing the change in the shape of the outer ear (ear canal) which accompanies the predetermined action.

Thus, according to this configuration, it is possible to construct a hands-free input device which can control an external output device or devices by a user wearing the sensor performing a simple action.

In the input device of the present invention, the controller preferably includes a comparator configured to compare the sensor signal received from the sensor with a predetermined criterion indicating a change in a physical quantity, and a signal generator configured to generate a control signal or signals for controlling the external output device or devices based on a result of the comparison by the comparator.

According to the input device having this configuration, it can be determined whether or not to generate a control command or commands, based on the result of the comparator's comparison of the sensor signal or signals received from the sensor with the predetermined criterion indicating the change in the physical quantity. If, based on the comparison result, it is determined that a control command or commands should be generated, the signal generator generates a control signal or signals for controlling the external output device or devices.

In the input device of the present invention, the criterion indicating the change in the physical quantity is preferably stored in an external storage medium or in a database provided on a network.

According to the input device having this configuration, if the criterion indicating the change in the physical quantity is stored in an external storage medium, the input device does not need to include a storage means, and therefore, the harware configuration of the input device can be simplified.

Also, if the criterion indicating the change in the physical quantity is stored in a database provided on a network, the control command or commands can be transmitted from the input device to the external output device or devices via a network, such as the Internet, etc., anytime and anywhere. Therefore, a wearable computer including the preferred input device can be constructed in society where networks are ubiquitous, which is expected to become a reality in the near future.

In the input device of the present invention, the criterion indicating the change in the physical quantity is preferably (a) that the amount of a change in a voltage is greater than or equal to a predetermined value, (b) that the changed voltage is sustained after the change of the voltage for a predetermined period of time or more, or a combination pattern of at least one (a) and at least one (b).

According to the input device having this configuration, if the criterion indicating the change in the physical quantity is that the amount of a change in a voltage is greater than or equal to a predetermined value, the change in the shape of the natural orifice sensed by the sensor can be reliably identified. As a result, it can be satisfactory determined whether or not to generate the control command or commands (control signal or signals). If the criterion indicating the change in the physical quantity includes a criterion that whether or not the voltage is sustained after the change of the voltage for a predetermined period of time or more, in addition to the criterion that the amount of the change in the voltage is greater than or equal to a predetermined value, the change in the shape of the natural orifice sensed by the sensor can be more reliably identified.

Moreover, in the input device of this configuration, a more complicated criterion indicating changes in physical quantities can be employed. This criterion is any combination pattern (i.e., a voltage change pattern) of at least one (a) "the amount of a change in a voltage is greater than or equal to a predetermined value" and at least one (b) "the changed voltage is sustained after the change of the voltage for a predetermined period of time or more." For example, when the voltage changes in an amount greater than or equal to the predetermined value, the voltage is sustained for the predetermined period of time or more, and the voltage changes in an amount greater than or equal to the predetermined value (in this case, a continuous change pattern of (a), (b), and (a)), the sensor can sense the change in the shape of the natural orifice. Thus, if a more complicated voltage change pattern is employed as the criterion indicating changes in physical quantities, it is possible to highly satisfactorily and reliably determine whether or not to generate the control command or commands (control signal or signals).

In the input device of the present invention, the sensor preferably includes a sensing device configured to be disposed at a predetermined position of the natural orifice, and an elastic member configured to abut the natural orifice and enclose the sensing device.

According to the input device having this configuration, the sensing device is provided at a predetermined position of the natural orifice, and in this case, the elastic member enclosing the sensing device abuts the natural orifice. Therefore, even when the sensor is worn in or on the natural orifice, the sensor can be slightly moved by the elastic member being deformed. By utilizing such a movement, the sensor signal can be amplified. The amplification by the movement is not electrical, but is caused by the mechanical structure of the sensor. Therefore, the amplified signal has a high S/N ratio, i.e., high quality.

Note that the sensing device is enclosed by the elastic member, and therefore, the comfort of the input device when a user wears the input device is advantageously improved.

In order to achieve the object, a wearable computer according to the present invention includes any one of the input devices described above and an external output device or devices configured to output information corresponding to a property of the natural orifice.

According to the wearable computer having this configuration, the external output device or devices are configured to output information corresponding to a property of the natural orifice in or on which the input device is worn, and therefore, the compatibility between the input device and the output device is high.

Also, by using the wearable computer of this configuration, it is possible to construct a facial expression recognition system. Specifically, the sensor of the input device senses a change in a shape of a natural orifice of the body of the wearer, and the controller recognizes the wearer's facial expression based on a sensor signal received from the sensor and outputs a control signal or signals to the external output device or devices. In this case, the external output device or devices outputs information to the wearer, the wearer's reaction (facial expression) to the information is input back to the input device, and based on the wearer's reaction, a sensor signal and a control signal are newly generated. Thus, a so-called biofeedback loop is formed between the wearable computer and the wearer. As a result, optimum information desired by the wearer can be provided in real time.

In the wearable computer of the present invention, the natural orifice is preferably an outer ear including an ear canal, and the external output device or devices are preferably an audio device.

According to the wearable computer having this configuration, when the natural orifice in or on which the input device is worn is the outer ear (including the ear canal), an audio device is employed as the output device or devices. Therefore, a user wearing the wearable computer can perform hands-free operation in an intuitive manner using his or her ear.

Also, if the wearable computer having this configuration is used, then when the frequency of the wearer's smile decreases, the external output device or devices may automatically play a relaxing sound or music, for example. Thus, the external output device or devices are allowed to provide an appropriate output corresponding to a condition of the wearer by using the biofeedback loop.

In order to achieve the object, an input method according to the present invention is an input method for outputting a control command or commands to an external output device or devices, including sensing a change in a shape of a natural orifice of the body, and controlling the external output device or devices based on the sensed change in the shape of the natural orifice.

According to the input method having this configuration, advantages similar to those of the input device of the present invention described above are obtained. Specifically, the change in the shape of the natural orifice can be sensed under an environment where external disturbing factors, such as external light etc., are eliminated to the extent possible. As a result, a highly reliable sensing result (the change in the shape of the natural orifice) is stably obtained. Based on the obtained sensor signal, the external output device or devices can be controlled with high accuracy.

In order to achieve the object, an input device according to the present invention is an input device for outputting a control command or commands to an external output device or devices, including a sensor configured to be worn in or on an artificial orifice surgically formed in a body and sense a change in a shape of the artificial orifice, and a controller configured to control the external output device or devices based on a sensor signal or signals from the sensor.

According to the input device having this configuration, the sensor is worn in or on the artificial orifice surgically formed in the body, and therefore, the change in the shape of the artificial orifice can be sensed under an environment where external disturbing factors, such as external light etc., are eliminated to the extent possible. As a result, a highly reliable sensor signal is stably obtained from the sensor. Based on the obtained sensor signal, the external output device or devices can be controlled with high accuracy.

DESCRIPTION OF EMBODIMENTS

Figure 1:
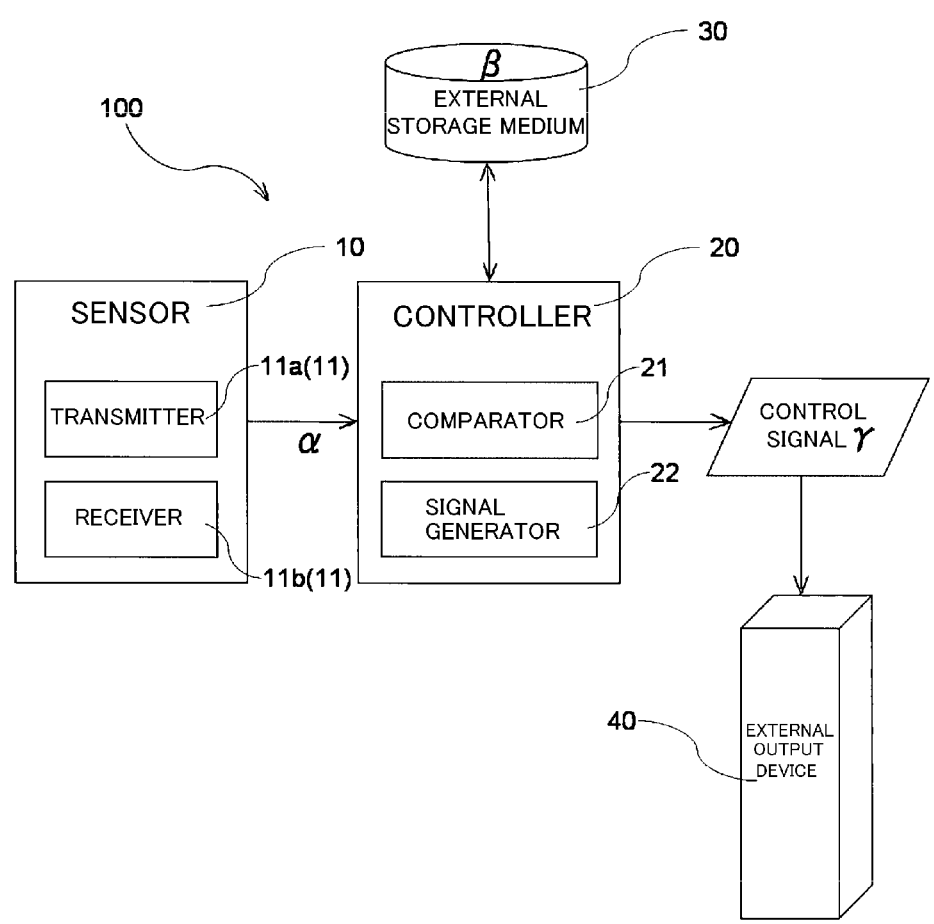
FIG. 1 is a block diagram schematically showing an input device according to the present invention.

Embodiments of an input device, a wearable computer including the input device, and an input method, according to the present invention, will be described with reference to the accompanying drawings. Note that the present invention is not intended to be limited to the embodiments described below or structures and arrangements shown in the drawings, but is intended to encompass equivalents thereof.

[Input Device]

FIG. 1 is a block diagram schematically showing an input device 100 according to the present invention. The input device 100 includes a sensor 10 and a controller 20 as basic components.

<Configuration of Sensor>

The sensor 10 is worn in or on a natural orifice of the body. As used herein, the term "natural orifice of the body" means an orifice of an organ etc. formed in the body. Examples of the natural orifice of the body include the outer ear (ear canal), nose (nasal cavity), mouth (oral cavity), anus, vagina, etc. In this embodiment, the outer ear (including the ear canal) is particularly used as the natural orifice of the body. Note that various sensors may be used as the sensor 10, and an optical sensor capable of measuring a distance to an object to be measured using light (e.g., a reflective photosensor, an FGB optical sensor, etc.) is preferably employed. The optical sensor includes a light emitting device, such as an LED, a light bulb, etc., and a light receiving device, such as a phototransistor, a photodiode, a CCD, etc. Note that an infrared LED is used as the LED, it is necessary to select one which emits infrared light having a wavelength which is not transmitted through the body. In this embodiment, the sensor 10 is assumed hereinafter to be an optical sensor. The sensor 10 is preferably of "ear hook (over- or on-ear) type" shown in FIG. 2 or "in-ear type" shown in FIG. 3 in terms of shape for ease of use.

(Ear Hook Type)

FIG. 2(a) is a perspective view of an ear hook type sensor 10. FIG. 2(b) is a diagram showing the sensor 10 which is worn on the outer ear. The ear hook type sensor 10 is worn to externally cover the outer ear without being substantially inserted in the ear canal. Therefore, once the ear hook type sensor 10 is worn, the position of the sensor 10 relative to the ear canal is substantially fixed. On the other hand, the ear canal has different portions whose shapes change in response to different situations. For example, a portion of the ear canal whose shape changes in response to the movement of the tongue is different from a portion of the ear canal whose shape changes in response to the movement of the eye. Therefore, the orientation of the sensor 10 worn relative to the outer ear is preferably adjusted as appropriate, depending on a movement to be measured. In this case, the orientation of the entire sensor 10 may be adjusted, or alternatively, only the orientation of a sensing device 11 may be adjusted.

The sensor 10 includes a transmitter 11a and a receiver 11b, which constitute the sensing device 11. The transmitter 11a transmits measurement light, a portion of which is reflected on a surface of the ear canal and is returned to the receiver 11b. Here, if the outer ear of the wearer wearing the input device 100 moves, a distance from the sensing device 11 of the sensor 10 to the reflecting surface of the ear canal changes. As a result, the intensity of the reflected light entering the sensing device 11 (the receiver 11b) changes. Therefore, by monitoring the change in the intensity of the reflected light, a change in the shape of the ear canal can be sensed. Note that a plurality of the sensing devices 11 may optionally be provided. Examples of the transmitter 11a include light emitting devices, such as an LED, a light bulb, etc. Examples of the receiver 11b include light receiving elements, such as a phototransistor, a photodiode, a CCD, etc. In particular, if an LED is employed as the transmitter 11a and a phototransistor or a photodiode is employed as the receiver 11b, noise in a sensor signal can be reduced, whereby the sensor signal can have high quality.

(In-Ear Type)

Figure 3:
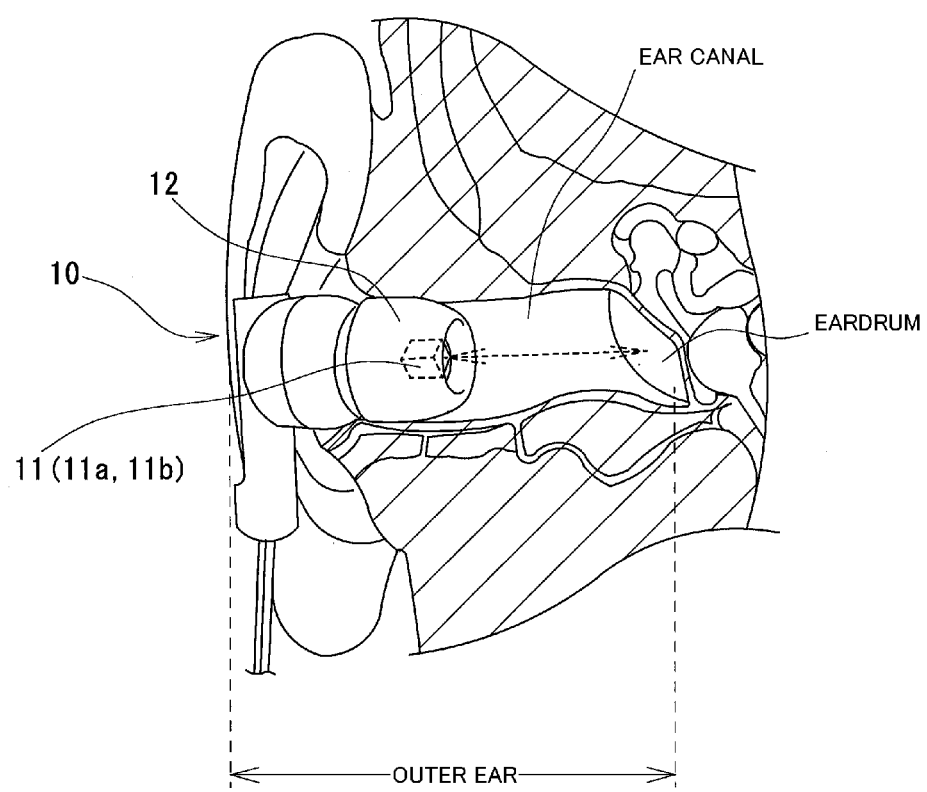
FIG. 3 is a diagram showing an in-ear type sensor.

FIG. 3 is a diagram showing the sensor 10 which is inserted in the ear canal. In the case of the in-ear type, the transmitter 11a and the receiver 11b of the sensing device 11 are enclosed by an elastic member 12. When the sensor 10 is inserted in the ear canal, the elastic member 12 abuts a surface of the ear canal. Therefore, even after the sensor 10 is inserted to a predetermined position (depth) in the ear canal, the sensing device 11 can be moved in the wearer's ear canal by the elastic member 12 being bent. On the other hand, even if the shape of the ear canal changes, the wearer's eardrum is not substantially moved. Therefore, the sensing device 11 is allowed to slightly move relative to the eardrum.

Note that, as described above, the different portions of the ear canal change their shapes in response to different situations. Therefore, by adjusting the shape or stiffness of the elastic member 12 as appropriate, the sensing device 11 of the sensor 10 is allowed to more easily sense a change in the shape of a specific portion of the ear canal. As a result, the sensor 10 can respond to only a specific action of the wearer. The elastic member 12 may include a combination of a relatively stiff member and a relatively flexible member. In this case, the elastic member 12 can be more finely adjusted.

The transmitter 11a transmits measurement light, a portion of which is reflected on a surface of the eardrum and is returned to the receiver 11b. Here, if the shape of the ear canal changes, the elastic member 12 is bent, so that the sensing device 11 is slightly moved relative to the eardrum, and therefore, a distance from the sensing device 11 to the reflecting surface of the eardrum changes. As a result, the intensity of the reflected light entering the sensing device (the receiver 11b) changes. Therefore, by monitoring the change in the intensity of the reflected light, a change in the shape of the ear canal can be sensed. Note that a plurality of the sensing devices 11 may optionally be provided.

Incidentally, in the in-ear type sensor 10, the aforementioned relative movement of the sensing device 11 can be utilized to amplify a sensor signal $\alpha$ described below. The amplification by the relative movement is not electrical, but is caused by the mechanical structure of the sensor 10. Therefore, the amplified signal has a high S/N ratio, i.e., high quality.

<Configuration of Controller>

When the sensing device 11 (the receiver 11b) of the sensor 10 receives the reflected light, the sensor 10 generates a sensor signal $\alpha$ corresponding to the sensed intensity, and transmits the sensor signal $\alpha$ to the controller 20. The controller 20 includes a comparator 21 and a signal generator 22. When the controller 20 receives the sensor signal $\alpha$ from the sensor 10, the comparator 21 compares the received sensor signal $\alpha$ with a criterion $\beta$ which indicates a change in a physical quantity which was previously determined.

Here, the criterion $\beta$ indicating the change in the physical quantity is stored in an external storage medium 30 as shown in FIG. 1. Examples of the external storage medium 30 include a flash memory, a hard disk, etc. With such a configuration, the input device 100 does not include a storage means. Therefore, the harware configuration of the input device 100 can be simplified.

On the other hand, instead of the external storage medium 30, a database (not shown) relating to the criterion $\beta$ which is provided on a network, such as the Internet, etc., may be used. In this case, a control command (control signal $\gamma$) described below can be transmitted from the input device 100 to an external output device 40 via a network, such as the Internet, etc., anytime and anywhere. Therefore, according to this arrangement, a preferred wearable computer including the input device 100 can be constructed in society where networks are ubiquitous, which is expected to become a reality in the near future.

Note that details of the aforementioned criterion $\beta$ indicating the change in the physical quantity and a specific procedure of comparison performed by the comparator 21 will be described in detail in "Input Method" and "Examples" sections described below.

The signal generator 22 generates a control command (control signal γ) to control the external output device 40 based on the result of comparison by the comparator 21. The control command (control signal γ) can be used as a command which is normally input by the user toggling a switch. Examples of the operation in the external output device 40 include turning on/off the power supply, activating/stopping a predetermined function, switching functions, etc. If a plurality of control commands (control signals γ) are provided, the input device 100 can be used as an alternative means to perform a relatively complicated input operation (e.g., typing on a keyboard, etc.).

According to the input device 100 of the present invention, the sensor 10 is worn in or on a natural orifice of the body (the ear canal in this embodiment), whereby a change in the shape of the natural orifice can be sensed under an environment where external disturbing factors, such as external light etc., are eliminated to the extent possible. As a result, a highly reliable sensor signal α is stably obtained from the sensor 10. Based on the obtained sensor signal α, the external output device 40 can be controlled with high accuracy.

Note that the sensor 10 is not limited to optical sensors. Any other sensors that can be worn in or on a natural orifice of the body and can sense a change in the shape of the natural orifice can be used as the sensor 10.

For example, the sensor 10 may be an acoustic sensor. The sensing device 11 of the sensor 10 includes the transmitter 11a and the receiver 11b. An example of the acoustic sensor is an ultrasonic distance sensor. An example of the transmitter 11a is a loudspeaker, and an example of the receiver 11b is a microphone. The transmitter 11a transmits a measurement wave, a portion of which is reflected on a surface of the ear canal and is returned to the receiver 11b. Here, if the outer ear of the wearer wearing the input device 100 moves, a distance from the sensing device 11 of the sensor 10 to the reflecting surface of the ear canal changes. As a result, the time that it takes until the reflected light enters the sensing device 11 (the receiver 11b) changes. Therefore, by monitoring the change in the time, a change in the shape of the ear canal can be sensed. Note that the frequency of an acoustic wave used as the measurement wave may be, for example, 20 kHz or more, which cannot be perceived by the human auditory system.

For example, the sensor 10 may also be a fiber Bragg grating (FBG) optical fiber sensor. In the FGB optical fiber sensor, a certain structural change is generated in the optical fiber and is used as a diffraction grating, whereby particular wavelengths of light traveling through the optical fiber can be sensed. The optical fiber of the FGB optical fiber sensor is extended along the surface of the ear canal so that the optical fiber can change its shape in response to the movement of the outer ear. When the shape of the optical fiber is changed, wavelengths of light traveling through the optical fiber are changed. Therefore, by monitoring the change in the wavelengths, a change in the ear canal caused by the movement of the outer ear can be sensed.

When an acoustic sensor, or the optical sensor of this embodiment, is used as the sensor 10, it is not necessary to fit the sensor 10 itself into a natural orifice of the body by strongly pressing, as is different from the pressure sensor. Therefore, it is possible to reduce the wearer's discomfort when he or she wears the input device 100. As a result, it is possible to wear the input device 100 for a long time, and therefore, the input device 100 can be preferably used in wearable computers.

Note that if an optical sensor is used as the sensor 10, the structure of the input device 100 can be simplified compared to a pressure sensor etc., and in addition, the cost of the input device 100 can be advantageously reduced.

[Wearable Computer]

If the input device 100 of the present invention is combined with any external output device 40, a preferred wearable computer capable of hands-free operation can be provided. Examples of the external output device 40 which can be combined with the input device 100 include audio devices, such as a music player etc., video devices, such as a DVD player etc., communications devices, such as a mobile telephone etc., medical devices, such as a hearing aid etc., and the like.

In particular, when the input device 100 of this embodiment which is worn in or on the outer ear is used to construct a wearable computer, an audio device which outputs a voice is preferably employed as the external output device 40. In other words, the external output device 40 which is combined with the input device 100 is preferably a device which outputs information corresponding to a property of a natural orifice in or on which the input device 100 is worn. Such a combination of the input device 100 and the external output device 40 is reasonable, and is excellent in terms of compatibility. For example, in this embodiment, the input device 100 which senses a change in the shape of the ear canal is combined with an audio device which outputs a voice to the ear canal, whereby the wearer wearing the input device 100 can perform hands-free operation in an intuitive manner using his or her ear.

The wearer wearing the input device 100 can operate a manual device while operating the external output device 40 in a hands-free manner. Examples of the manual device include computer input devices, such as a keyboard, a mouse, etc. When a keyboard is selected as the manual device and a mouse is selected as the external output device 40, the two computer input devices can be simultaneously operated, whereby the efficiency of operating a computer can be increased.

A device which is required to perform a complicated operation (e.g., a robot manipulator etc.) may be selected as the external output device 40. Such an external device may be combined with a plurality of the input devices 100. In this case, the input devices 100 may be worn by a plurality of wearers so that the complicated operation is shared by the wearers, whereby the external device can be simply and efficiently operated.

Moreover, according the wearable computer of the present invention, it is possible to construct a facial expression recognition system. Specifically, the sensor 10 of the input device 100 senses a change in the shape of a natural orifice of the body of the wearer, and the controller recognizes the wearer's facial expression based on a sensor signal α received from the sensor 10 and outputs a control signal γ to the external output device 40. In this case, the external output device 40 outputs information to the wearer, the wearer's reaction (facial expression) to the information is input back to the input device 100, and based on the wearer's reaction, a sensor signal α and a control signal γ are newly generated. Thus, a so-called biofeedback loop is formed between the wearable computer and the wearer. As a result, optimum information desired by the wearer can be provided in real time.

For example, when the frequency of the wearer's smile decreases, the external output device 40 may automatically play a relaxing sound or music. Thus, the external output device 40 is allowed to provide an appropriate output corresponding to a condition of the wearer.

A wearable computer having a watching function can also be preferably provided by combining the input device 100 of the present invention with any external output device 40. For example, by imparting a function of a hearing aid to the input device 100 of the present invention, a "hearing aid with a built-in input device" may be constructed as a wearable computer having a watching function. With this hearing aid with a built-in input device, hearing which has been degraded by aging etc. can be assisted by the hearing aid function, and in addition, an apparatus, such as a television etc., can be operated in a hands-free manner by intentionally changing a facial expression, i.e., producing an unusual facial expression. The hearing aid with a built-in input device may be combined with an external output device 40, such as a network terminal (e.g., a mobile telephone etc.). By constantly measuring and analyzing the wearer's mastication, sneezing, etc., data indicating the wearer's living conditions may be created. The data may be transmitted via a network terminal to a remote family or health care provider. Thus, a system for watching and assisting the wearer's life may be constructed. Alternatively, by adding a temperature sensor, such as a thermocouple etc., body temperature can be constantly measured. Thus, the hearing aid with a built-in input device is also applicable to remote diagnosis.

[Input Method]

Figure 4:
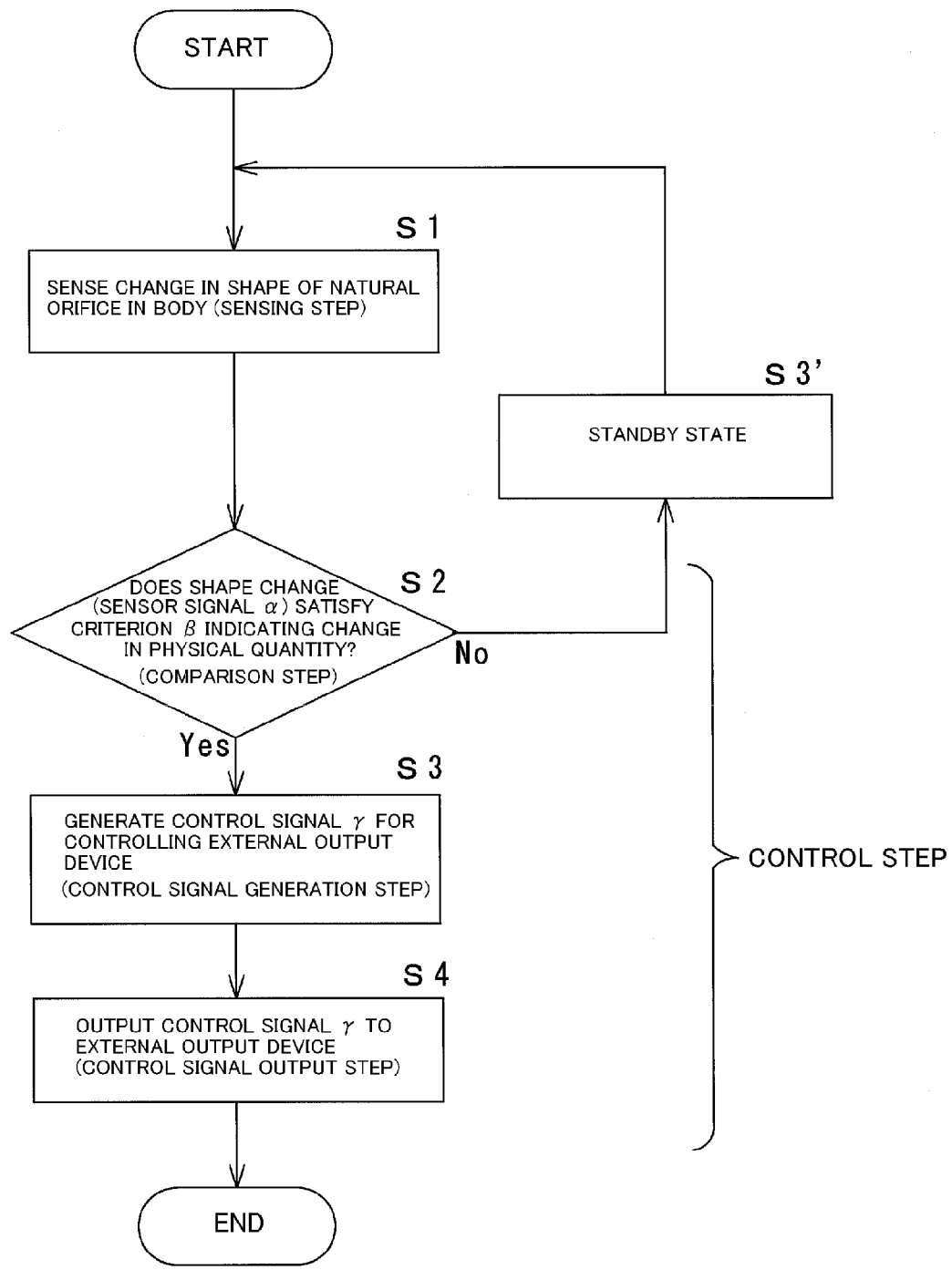
FIG. 4 is a flowchart showing an input method according to the present invention.

Next, an input method which is performed using the input device 100 of the present invention will be described. FIG. 4 is a flowchart showing the input method of the present invention. In the flowchart, each step is indicated by a symbol "S." The input method of the present invention includes a "sensing step" of sensing a change in the shape of a natural orifice of the body and a "control step" of controlling the external output device 40 based on the sensed change in the shape of the natural orifice, which are performed after "preliminary preparation" described below.

<Preliminary Preparation>

Figure 2:
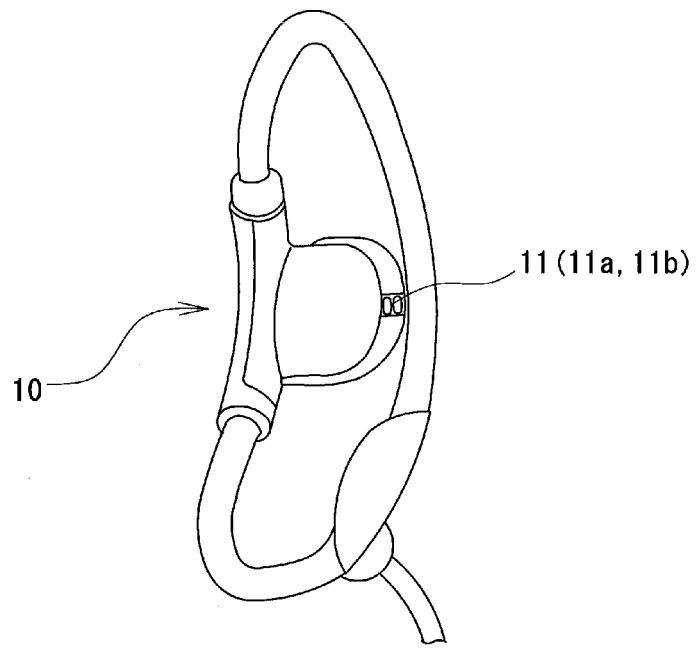
FIG. 2 is a diagram showing an ear hook type sensor.
Figure 2:
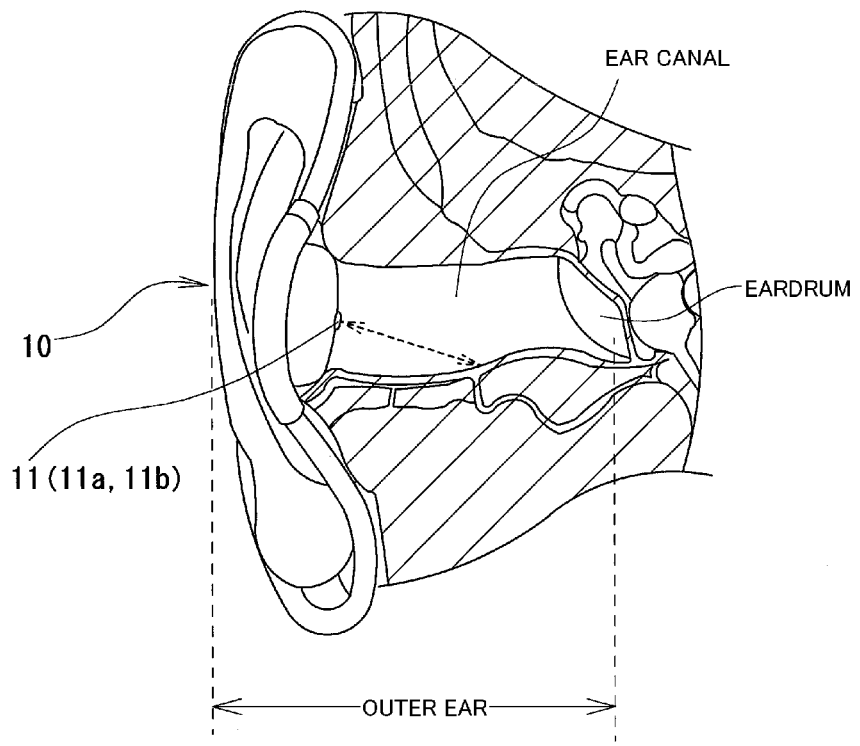

Prior to performing the input method of the present invention, the input device 100 is worn on the user (wearer). This is achieved by attaching the sensor 10 to the outer ear so that the sensor externally covers the outer ear as shown in FIG. 2, or inserting the sensor 10 into the wearer's ear canal as shown in FIG. 3. The sensor 10 may be worn in or on only one outer ear (including the ear canal), or alternatively, two of the sensors 10 may be prepared and worn in or on both the outer ears. Thus, if the two sensors 10 are used to sense changes in the shapes of both the ear canals (outer ears), a more complicated input operation can be performed.

<Sensing Step>

If the wearer desires to operate the external output device 40 (i.e., the wearer desires to enter information into the external output device 40), the wearer performs a predetermined action. The predetermined action is an intentional action which is typically not often performed in everyday situations, such as a blinking action of opening and closing the eyes (eyelids) strongly, an action of moving the eyes (eyeballs) to the left and right, an action of swinging the tongue, a masticating action of opening and closing the mouth by moving the jaw to a large degree, an expanding/contracting action of moving the muscles of the face, etc. These actions may be performed singly or in combination. If the predetermined action is performed, the shape of the ear canal (outer ear) of the wearer is changed. The change in the shape of the ear canal (outer ear) is sensed by the sensor 10 (step 1 (sensing step)). The sensor 10 generates a sensor signal α corresponding to the change of the shape of the ear canal (outer ear).

<Control Step>

Next, in the comparator 21, the sensor signal α is compared with the criterion β which indicates a change in a physical quantity which was previously determined, to determine whether or not the sensor signal α indicating the shape change satisfies the criterion β (step 2 (comparison step)). When the sensor signal α does not satisfy the criterion β (No in step 2), the input device 100 is temporarily transitioned to the standby state (step 3'), and thereafter, returns to the sensing step (step 1) and updates the sensor signal α. When the sensor signal α satisfies the criterion β (Yes in step 2), the signal generator 22 generates a control command (control signal γ) to control the external output device 40 (step 3 (control signal generation step)). The controller 20 outputs the generated control command (control signal γ) to the external output device 40 (step 4 (control signal output step)). Thus, the comparison step (step 2), the control signal generation step (step 3), and the control signal output step (step 4) constitute the control step of controlling the external output device 40 based on the sensor signal α indicating a change in the shape of the ear canal (outer ear).

EXAMPLES

Next, specific examples of the present invention will be described. The sensor 10 of the input system 100 used in the examples is of the ear hook type of FIG. 2. The sensor 10 was worn on both ears of the wearer to measure changes in the shapes of the ear canals. It can be determined whether or not the shape of the ear canal has changed, based on the amount of a change in the voltage of the sensor signal α generated by the sensor 10 (a simple change amount, or the amount of a rise of the voltage per unit time), or a duration for which the voltage is sustained after the change. Note that the term "simple change amount" refers to a value obtained by subtracting a voltage value before the change from a voltage value after the change. Therefore, if the voltage value after the change is greater than the voltage value before the change, the simple change amount has a positive value. If the voltage value after the change is smaller than the voltage value before the change, the simple change amount has a negative value. In each example, the result of measurement of a change in the shape of the ear canal of the right ear canal is described as a representative.

Example 1

Figure 5:
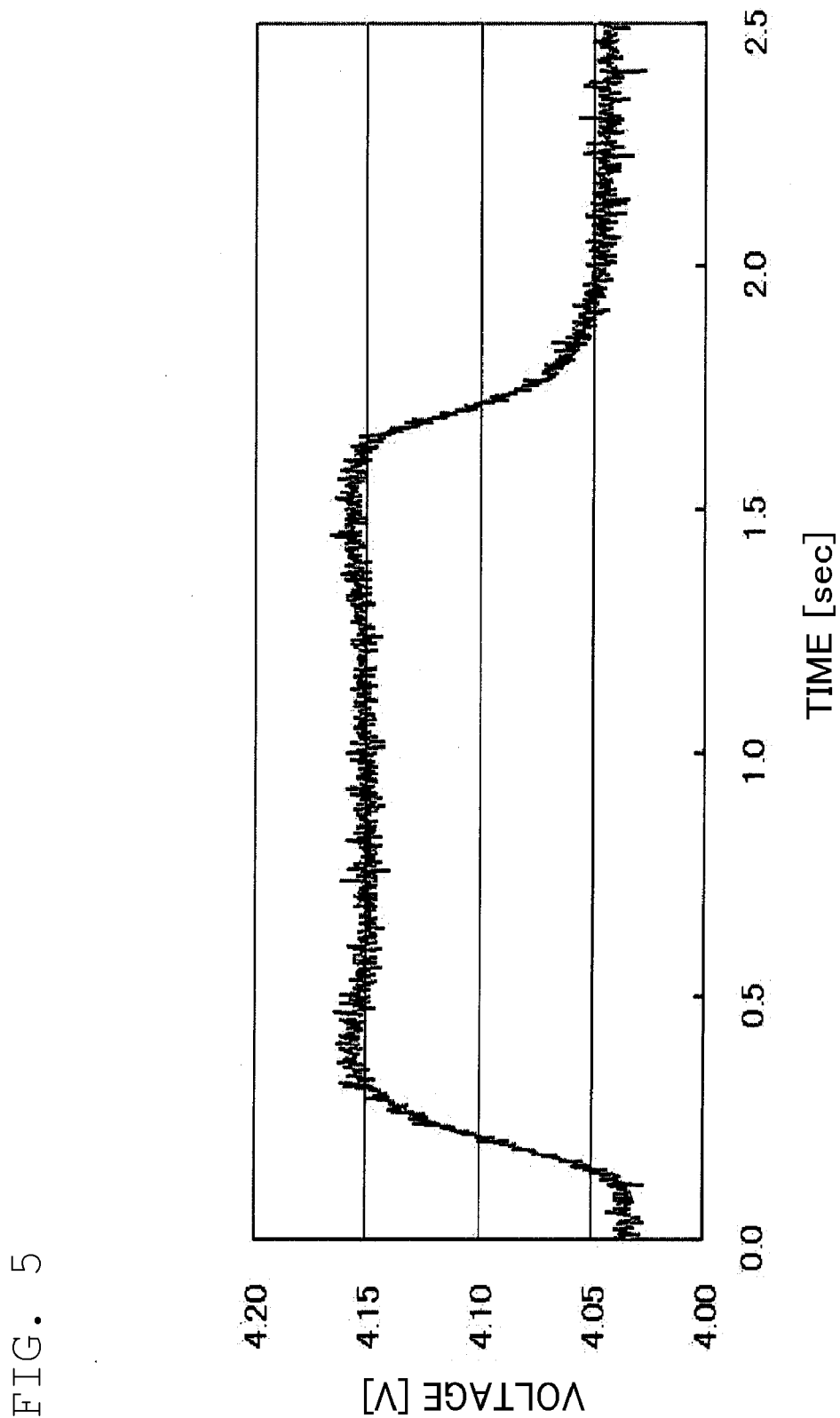
FIG. 5 is a graph showing changes with time of a sensor signal in Example 1.

As a predetermined action which is intended to operate the external output device 40, the wearer initially opened his or her eyes wide and kept the eyes in the same state for a while, and thereafter returned the eyes to the original state. FIG. 5 shows a graph indicating changes with time of the sensor signal α which correspond to changes in the shape of the ear canal which were sensed by the sensor 10 of the input system 100 during the series of actions.

From the graph of FIG. 5, the simple change amount of the voltage was determined to be about 0.12 V, and the amount of the rise of the voltage per unit time was determined to be about 0.6 V/sec. The duration of the sustained voltage after the rise was determined to be about 1.3 sec. These values were stored as the criterion β indicating changes in the physical quantities in the external storage medium 30. Note that, although not shown, a similar result was obtained for the measurement of a change in the shape of the ear canal of the left ear.

When the predetermined action of Example 1 is performed, then if, for example, the simple change amount of the voltage of the sensor signal α generated by the sensor 10 is 0.12 V or more (e.g., 0.13 V), or the amount of the rise of the voltage is 0.6 V/sec or more (e.g., 0.7 V/sec), the controller 20 determines that a change has occurred in the shape of the ear canal, and transmits a control command (control signal γ) to the external output device 40. Alternatively, if the simple change amount of the voltage of the sensor signal α generated by the sensor 10 is 0.12 V or more, or the amount of the rise of the voltage is 0.6 V/sec or more and the duration is a predetermined period of time or more (e.g., 0.5 sec or more), the controller 20 determines that a change has occurred in the shape of the ear canal, and transmits a control command (control signal γ) to the external output device 40.

Example 2

Figure 6:
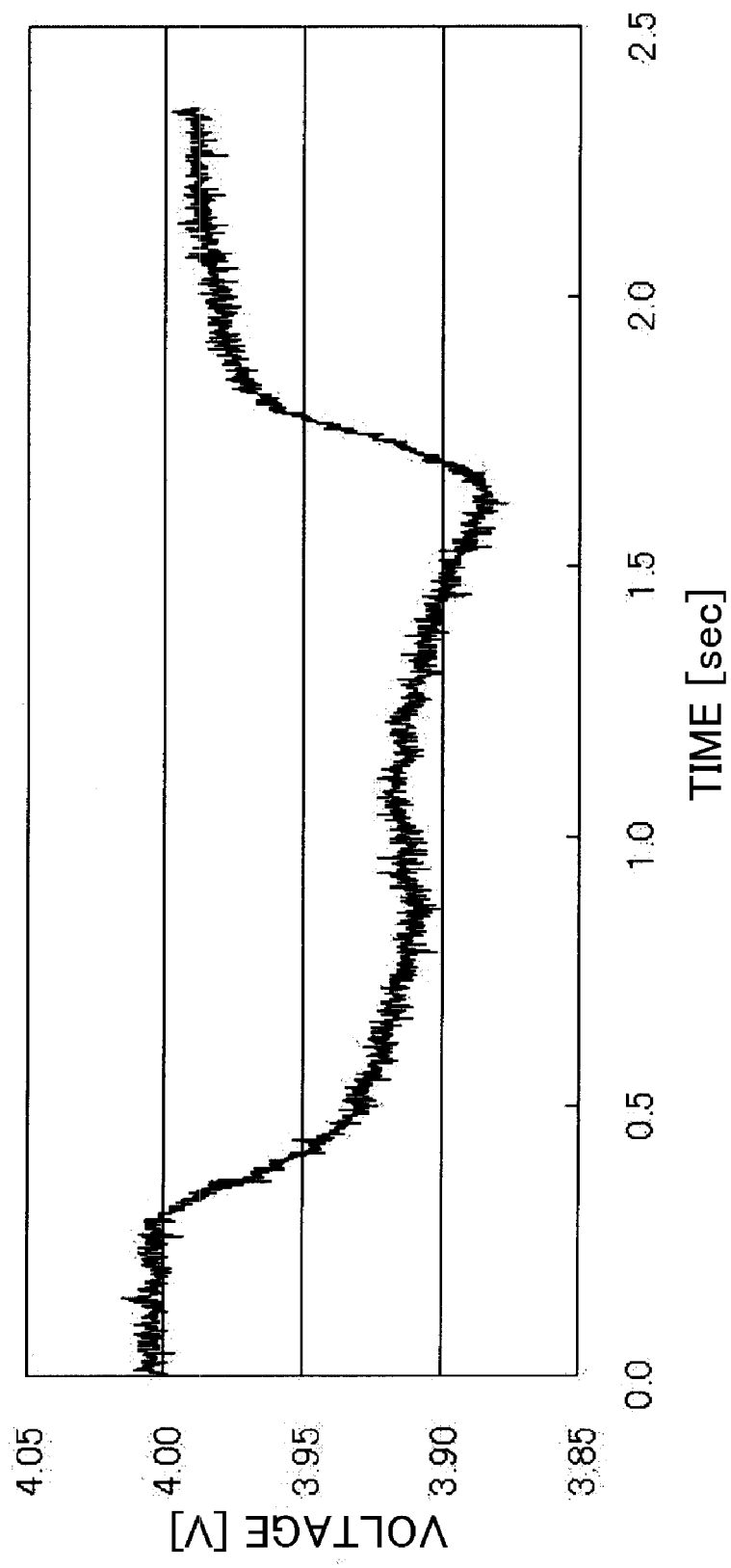
FIG. 6 is a graph showing changes with time of a sensor signal in Example 2.

As a predetermined action which is intended to operate the external output device 40, the wearer initially closed his or her eyes strongly and kept the eyes in the same state for a while, and thereafter returned the eyes to the original state. FIG. 6 shows a graph indicating changes with time of the sensor signal α which correspond to changes in the shape of the ear canal which were sensed by the sensor 10 of the input system 100 during the series of actions.

From the graph of FIG. 6, the simple change amount of the voltage was determined to be about −0.06 V, and the amount of the rise of the voltage per unit time was determined to be about −0.3 V/sec. Although the sustained voltage was not stable, the duration of the sustained voltage was observed to be at least about 1.0 sec. These values were stored as the criterion β indicating changes in the physical quantities in the external storage medium 30. Note that, although not shown, a similar result was obtained for the measurement of a change in the shape of the ear canal of the left ear.

When the predetermined action of Example 2 is performed, then if, for example, the simple change amount of the voltage of the sensor signal α generated by the sensor 10 is −0.06 V or less (e.g., −0.07 V), or the amount of the rise of the voltage is −0.3 V/sec or less (e.g., −0.4 V/sec), the controller 20 determines that a change has occurred in the shape of the ear canal, and transmits a control command (control signal γ) to the external output device 40. Alternatively, if the simple change amount of the voltage of the sensor signal α generated by the sensor 10 is −0.06 V or less, or the amount of the rise of the voltage is −0.3 V/sec or less and the duration is a predetermined period of time or more (e.g., 0.5 sec or more), the controller 20 determines that a change has occurred in the shape of the ear canal, and transmits a control command (control signal γ) to the external output device 40.

Example 3

Figure 7:
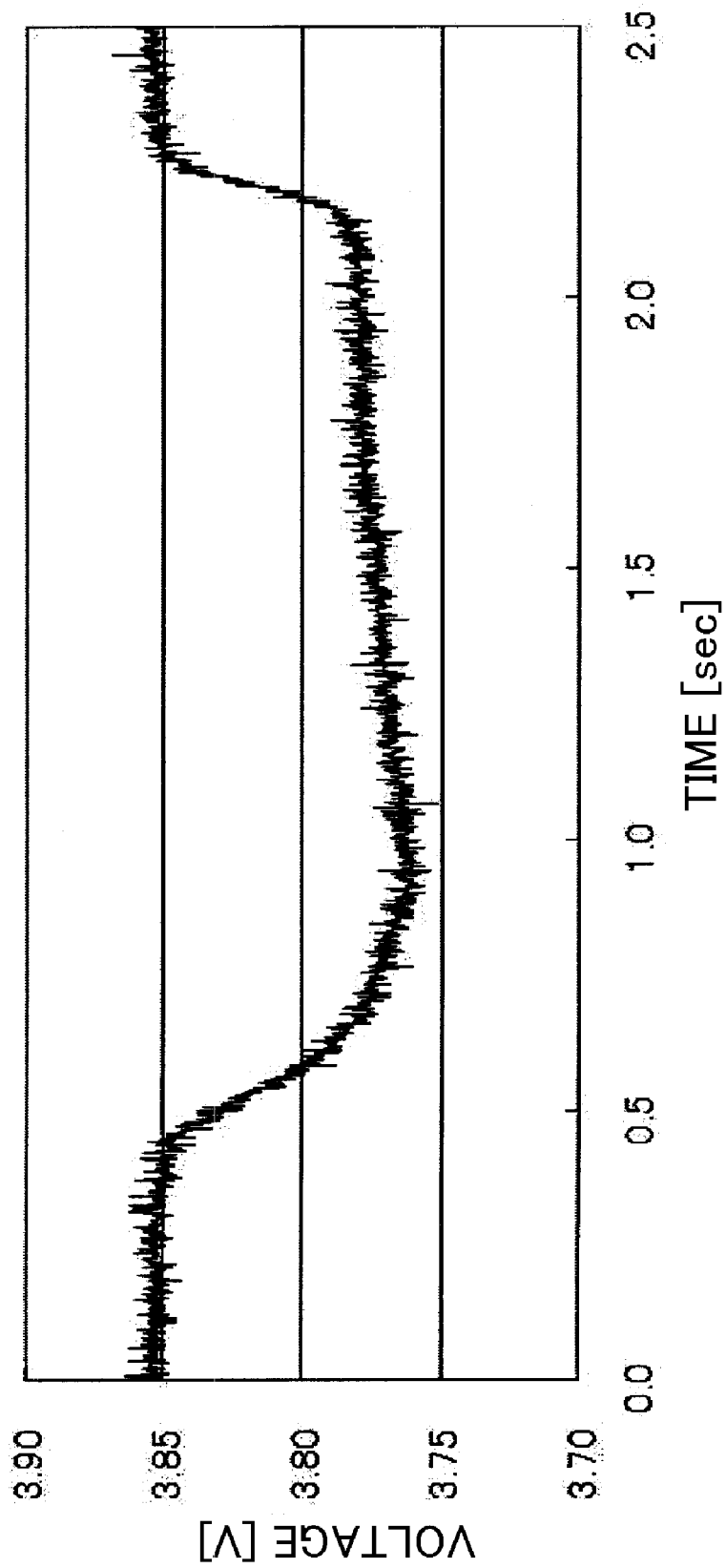
FIG. 7 is a graph showing changes with time of a sensor signal in Example 3.

As a predetermined action which is intended to operate the external output device 40, the wearer initially moved his or her tongue to the left to a large degree and kept the tongue in the same state for a while, and thereafter returned the tongue to the original state. FIG. 7 shows a graph indicating changes with time of the sensor signal α which correspond to changes in the shape of the ear canal which were sensed by the sensor 10 of the input system 100 during the series of actions.

From the graph of FIG. 7, the simple change amount of the voltage was determined to be about −0.07 V, and the amount of the rise of the voltage per unit time was determined to be about −0.4 V/sec. The duration of the sustained voltage after the rise was determined to be about 1.5 sec. These values were stored as the criterion β indicating changes in the physical quantities in the external storage medium 30.

When the predetermined action of Example 3 is performed, then if, for example, the simple change amount of the voltage of the sensor signal α generated by the sensor 10 is −0.07 V or less (e.g., −0.08 V), or the amount of the rise of the voltage is −0.4 V/sec or less (e.g., −0.5 V/sec), the controller 20 determines that a change has occurred in the shape of the ear canal, and transmits a control command (control signal γ) to the external output device 40. Alternatively, if the simple change amount of the voltage of the sensor signal α generated by the sensor 10 is −0.07 V or less, or the amount of the rise of the voltage is −0.4 V/sec or less and the duration is a predetermined period of time or more (e.g., 0.5 sec or more), the controller 20 determines that a change has occurred in the shape of the ear canal, and transmits a control command (control signal γ) to the external output device 40.

Example 4

Figure 8:
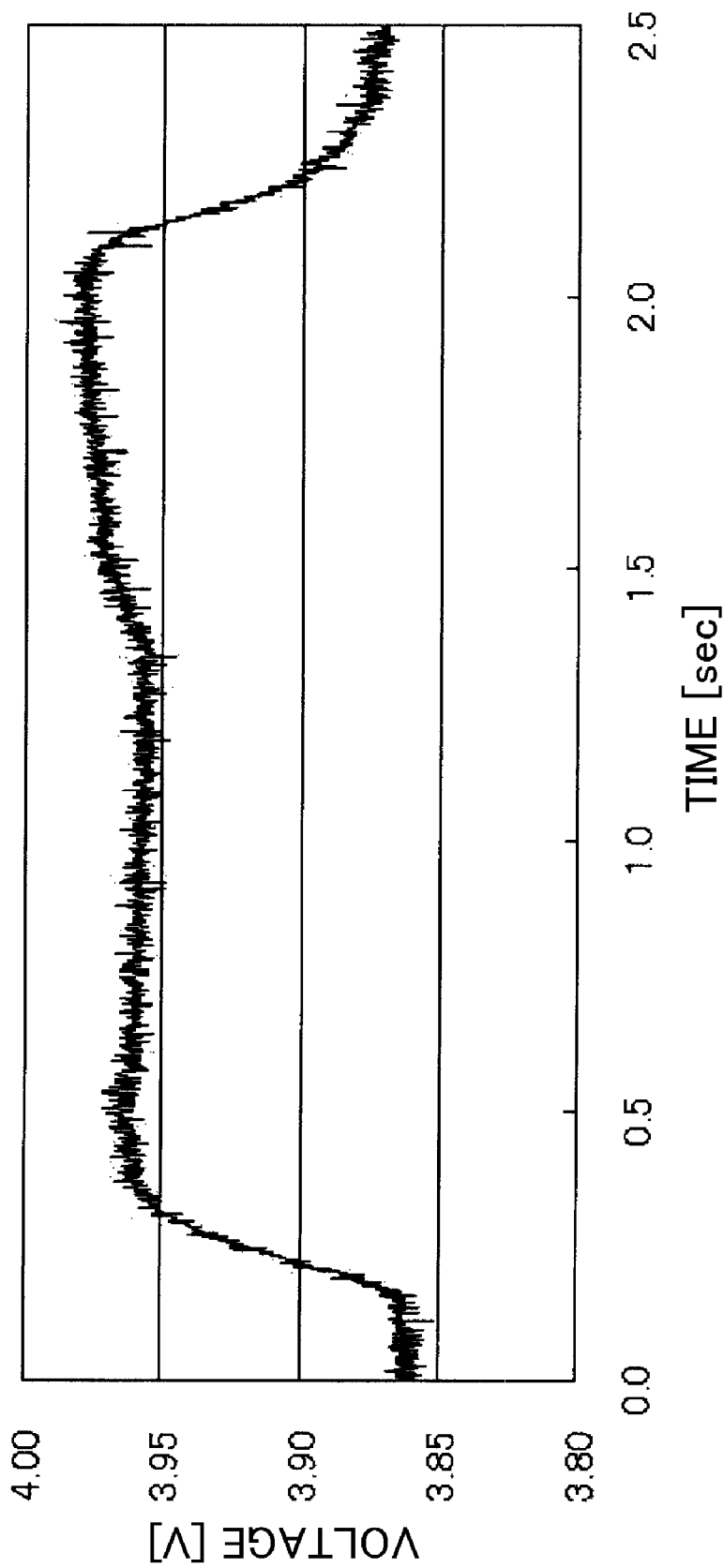
FIG. 8 is a graph showing changes with time of a sensor signal in Example 4.

As a predetermined action which is intended to operate the external output device 40, the wearer initially moved his or her tongue to the right to a large degree and kept the tongue in the same state for a while, and thereafter returned the tongue to the original state. FIG. 8 shows a graph indicating changes with time of the sensor signal α which correspond to changes in the shape of the ear canal which were sensed by the sensor 10 of the input system 100 during the series of actions.

From the graph of FIG. 8, the simple change amount of the voltage was determined to be about 0.10 V, and the amount of the rise of the voltage per unit time was determined to be about 0.5 V/sec. The duration of the sustained voltage after the rise was determined to be about 1.6 sec. These values were stored as the criterion β indicating changes in the physical quantities in the external storage medium 30.

When the predetermined action of Example 4 is performed, then if, for example, the simple change amount of the voltage of the sensor signal α generated by the sensor 10 is 0.10 V or more (e.g., 0.11 V), or the amount of the rise of the voltage is 0.5 V/sec or more (e.g., 0.6 V/sec), the controller 20 determines that a change has occurred in the shape of the ear canal, and transmits a control command (control signal γ) to the external output device 40. Alternatively, if the simple change amount of the voltage of the sensor signal α generated by the sensor 10 is 0.10 V or more, or the amount of the rise of the voltage is 0.5 V/sec or more and the duration is a predetermined period of time or more (e.g., 0.5 sec or more), the controller 20 determines that a change has occurred in the shape of the ear canal, and transmits a control command (control signal γ) to the external output device 40.

Note that the graph (FIG. 8) of Example 4 indicating the case where the tongue was moved to the right has a profile substantially opposite to that of the graph (FIG. 7) of Example 3 indicating the case where the tongue was moved to the left. Therefore, the wearer wearing the input system 100 can use different control commands (control signals γ) separately by moving his or her tongue to the left and right.

Example 5

Figure 9:
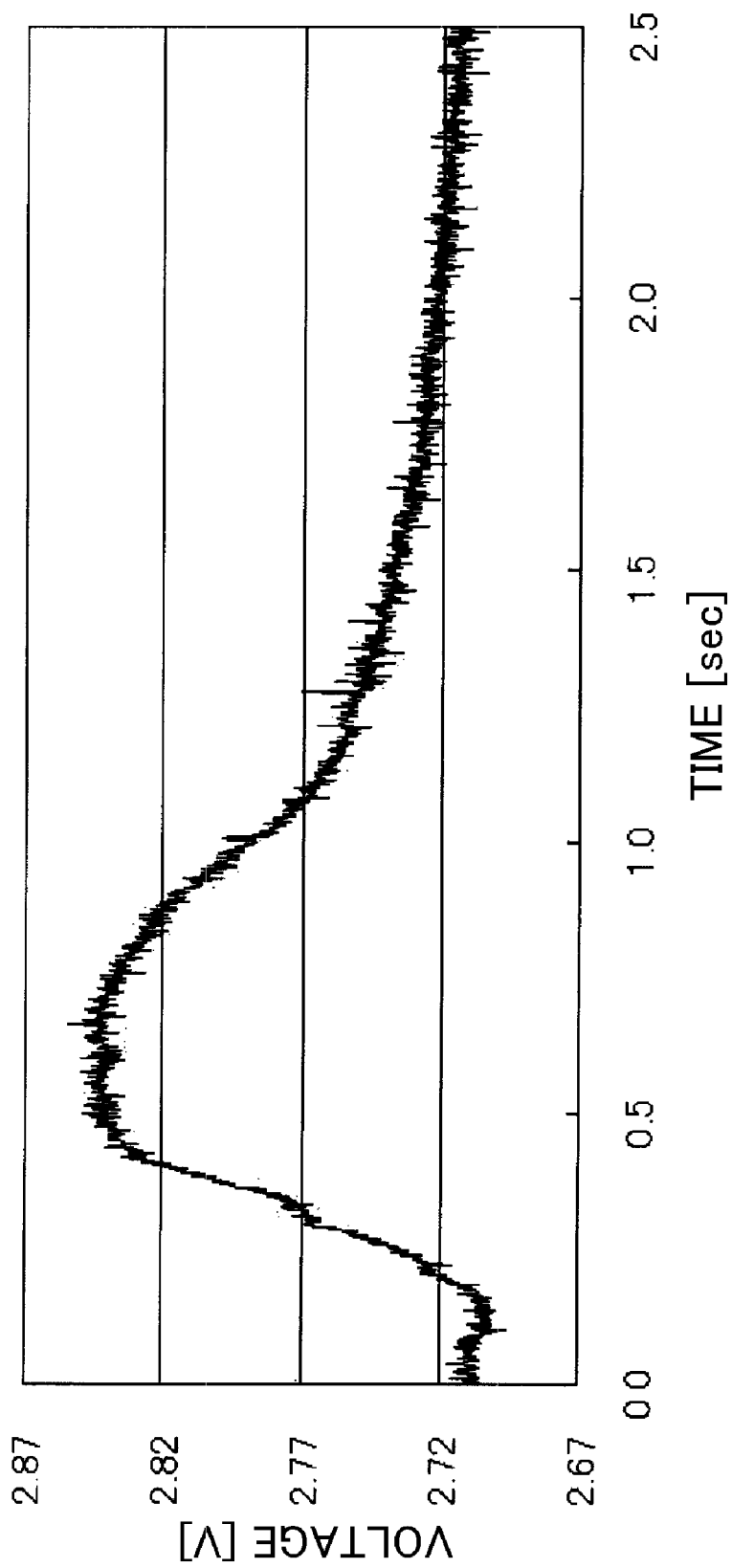
FIG. 9 is a graph showing changes with time of a sensor signal in Example 5.

As a predetermined action which is intended to operate the external output device 40, the wearer initially moved his or her eyes to the right and kept the eyes in the same state for a while, and thereafter returned the eyes to the original state. FIG. 9 shows a graph indicating changes with time of the sensor signal α which correspond to changes in the shape of the ear canal which were sensed by the sensor 10 of the input system 100 during the series of actions.

From the graph of FIG. 9, the simple change amount of the voltage was determined to be about 0.14 V, and the amount of the rise of the voltage per unit time was determined to be about 0.8 V/sec. These values were stored as the criterion β indicating changes in the physical quantities in the external storage medium 30. The sustained voltage was not stable, and the duration of the sustained voltage was short. Note that, although not shown, a change in the shape of the ear canal of the left ear was not observed.

When the predetermined action of Example 5 is performed, then if, for example, the simple change amount of the voltage of the sensor signal α generated by the sensor 10 is 0.14 V or more (e.g., 0.15 V), or the amount of the rise of the voltage is 0.8 V/sec or more (e.g., 0.9 V/sec), the controller 20 determines that a change has occurred in the shape of the ear canal, and transmits a control command (control signal γ) to the external output device 40.

Note that, in Example 5, the result of measurement on the left and right ears varies depending on the movement of the eyes. Therefore, the wearer wearing the input system 100 can use different control commands (control signals γ) separately by moving his or her eyes to the left and right.

In view of the results of Examples 3, 4, and 5, the movement of the wearer's tongue can be distinguished from the movement of the user's eyes, and the movement of the user's tongue or eyes to the left can be distinguished from the movement of the user's tongue or eyes to the right. Therefore, if the wearer wears the sensors 10 on both his or her ears, and different control commands (control signals γ) are assigned to different sensor signals α transmitted from the sensors 10 to the controller 20, a plurality of controls can be performed on the external output device 40.

Example 6

Figure 10:
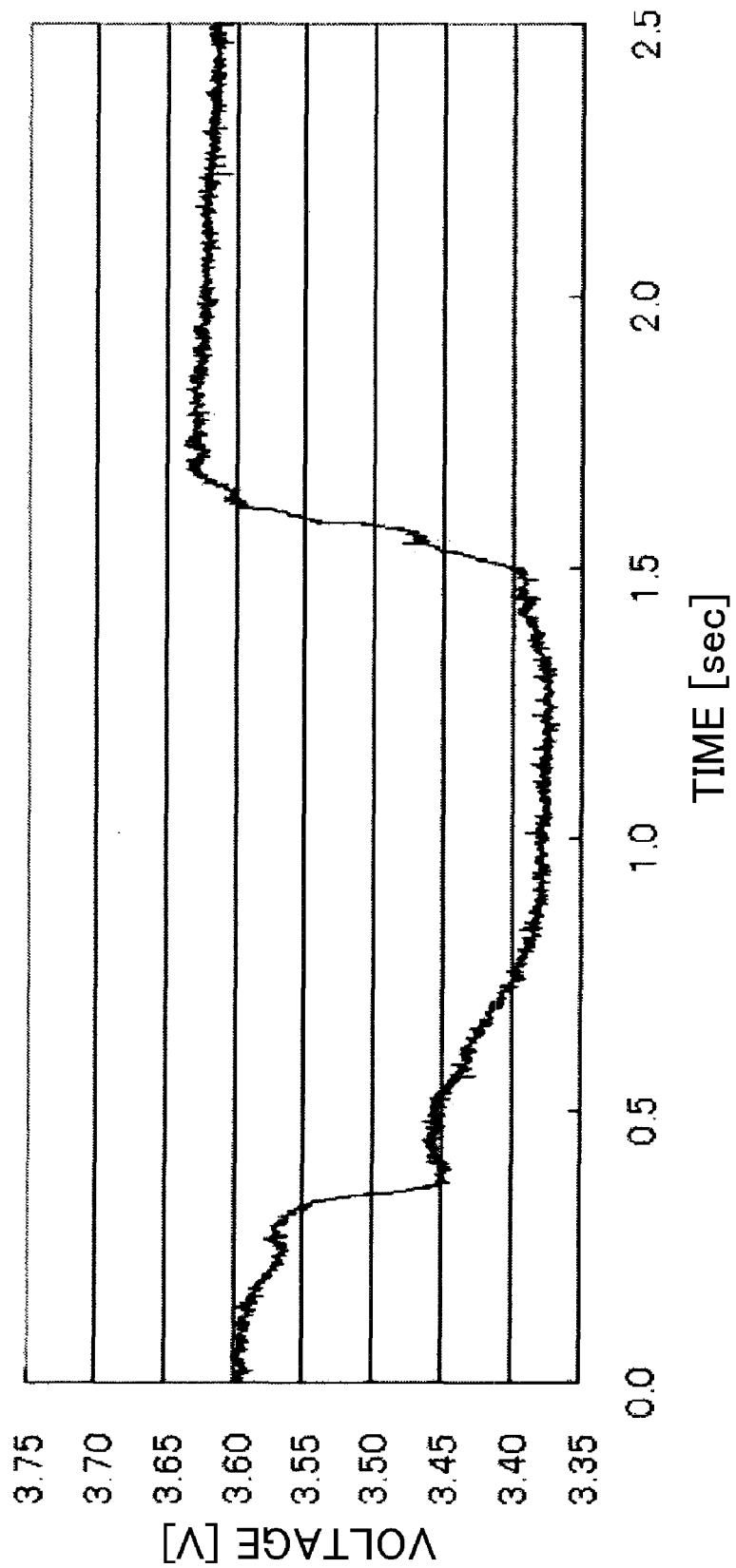
FIG. 10 is a graph showing changes with time of a sensor signal in Example 6.

As a predetermined action which is intended to operate the external output device 40, the wearer initially opened his or her mouth wide and kept the mouth in the same state for a while, and thereafter returned the mouth to the original state. FIG. 10 shows a graph indicating changes with time of the sensor signal α which correspond to changes in the shape of the ear canal which were sensed by the sensor 10 of the input system 100 during the series of actions.

From the graph of FIG. 10, the simple change amount of the voltage was determined to be about −0.14 V, and the amount of the rise of the voltage per unit time was determined to be about −10.0 V/sec. The duration of the sustained voltage after the rise was determined to be about 2.1 sec. These values were stored as the criterion β indicating changes in the physical quantities in the external storage medium 30. Note that, although not shown, a similar result was obtained for the measurement of a change in the shape of the ear canal of the left ear.

When the predetermined action of Example 6 is performed, then if, for example, the simple change amount of the voltage of the sensor signal α generated by the sensor 10 is −0.14 V or less (e.g., −0.15 V), or the amount of the rise of the voltage is −10.0 V/sec or less (e.g., −11.0 V/sec), the controller 20 determines that a change has occurred in the shape of the ear canal, and transmits a control command (control signal γ) to the external output device 40. Alternatively, if the simple change amount of the voltage of the sensor signal α generated by the sensor 10 is −0.14 V or less, or the amount of the rise of the voltage is −10.0 V/sec or less and the duration is a predetermined period of time or more (e.g., 0.5 sec or more), the controller 20 determines that a change has occurred in the shape of the ear canal, and transmits a control command (control signal γ) to the external output device 40.

Note that, in Example 6, a positive correlation was observed between the degree to which the mouth is opened and the magnitude of the voltage value. Therefore, the wearer wearing the input system 100 can use different control commands (control signals γ) separately by adjusting the degree to which the mouth is opened.

Example 7

Figure 11:
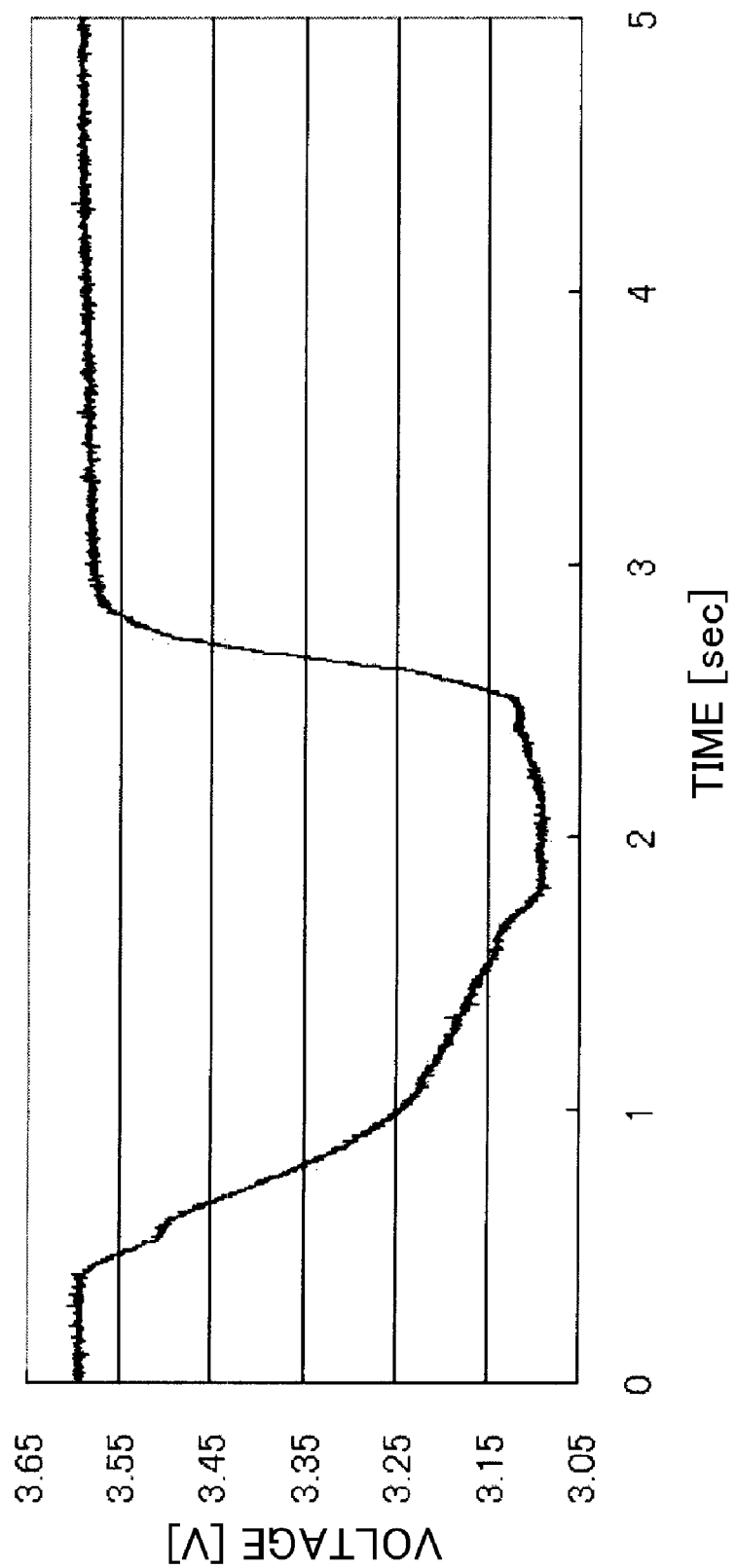
FIG. 11 is a graph showing changes with time of a sensor signal in Example 7.

As a predetermined action which is intended to operate the external output device 40, the wearer who had shown no expression on his or her face initially showed a smile on his or her face and kept the face in the same state for a while, and thereafter returned the face to the original state (no expression on the face). FIG. 11 shows a graph indicating changes with time of the sensor signal α which correspond to changes in the shape of the ear canal which were sensed by the sensor 10 of the input system 100 during the series of actions.

From the graph of FIG. 11, the simple change amount of the voltage was determined to be about −0.38 V, and the amount of the rise of the voltage per unit time was determined to be about −0.5 V/sec. Although the sustained voltage was not stable, the duration of the sustained voltage was observed to be at least about 1.0 sec. These values were stored as the criterion β indicating changes in the physical quantities in the external storage medium 30. Note that, although not shown, a similar result was obtained for the measurement of a change in the shape of the ear canal of the left ear.

When the predetermined action of Example 7 is performed, then if, for example, the simple change amount of the voltage of the sensor signal α generated by the sensor 10 is −0.38 V or less (e.g., −0.39 V), or the amount of the rise of the voltage is −0.5 V/sec or less (e.g., −0.6 V/sec), the controller 20 determines that a change has occurred in the shape of the ear canal, and transmits a control command (control signal γ) to the external output device 40. Alternatively, if the simple change amount of the voltage of the sensor signal α generated by the sensor 10 is −0.38 V or less, or the amount of the rise of the voltage is −0.5 V/sec or less and the duration is a predetermined period of time or more (e.g., 0.5 sec or more), the controller 20 determines that a change has occurred in the shape of the ear canal, and transmits a control command (control signal γ) to the external output device 40.

Note that, in Example 7, the wearer intentionally changes his or her facial expression. Alternatively, the sensor 10 may sense a change in the shape of the ear canal corresponding to an unintentional change in the wearer's facial expression, and based on the sensor signal α in this case, the controller 20 may recognize the wearer's facial expression and output a control command (control signal γ) to the external output device 40. With such a control, the input device 100 (wearable computer) of the present invention can be used as a facial expression recognition system.

Example 8

In Examples 1-7, it is determined whether or not a change has occurred in the shape of the ear canal, based on (a) "the amount of a change in the voltage of the sensor signal α generated by the sensor 10 (the simple change amount, or the amount of the rise of the voltage per unit time," or (a)+(b) "the duration for which the voltage is sustained after the change." Alternatively, the criterion indicating changes in physical quantities may be defined as any combination pattern (i.e., a voltage change pattern) of at least one (a) and at least one (b).

For example, in the case of the graph of FIG. 5 used in Example 1, the initial simple change amount of the voltage was determined to be about 0.12 V, the duration of the sustained voltage after the change was determined to be about 1.3 sec, and the end simple change amount of the voltage was determined to be about −0.10 V. This voltage change pattern is stored as the criterion β indicating changes in the physical quantities in the external storage medium 30. When a change pattern of the voltage of the sensor signal α generated by the sensor 10 substantially matches the criterion β, the controller 20 determines that a change has occurred in the shape of the ear canal, and transmits a control command (control signal γ) to the external output device 40. Thus, if a more complicated voltage change pattern is employed as the criterion β indicating changes in the physical quantities, it can be highly satisfactorily and reliably determined whether or not to generate a control command (control signal γ).

Because a change in the wearer's action is reflected on a change in the shape of the ear canal, a continuous action of the wearer can be identified by sensing a continuous change in the shape of the ear canal. Therefore, when it is determined that a change in the shape of the ear canal is continuous, a control command (control signal γ) to cause the external output device 40 to perform a continuous operation (e.g., an operation of turning the volume up or down) can be transmitted to the external output device 40. For example, it can be determined whether the wearer has rotated his or her tongue or eyes clockwise or anticlockwise or for what period of time the wearer has rotated his or her tongue or eyes. Therefore, the direction of the rotation corresponds to the increase/decrease of the volume. By defining the criterion β and the control signal γ so that the duration of the rotation corresponds to a period of time for which the volume is turned up or down, the external output device 40 can be continuously operated (the operation of turning the volume up or down).

Thus, the wearer's continuous action which is intended to continuously operate the external output device 40 causes a continuous change in the shape of a natural orifice. Therefore, by associating a continuous action with a continuous operation of the external output device 40, the wearer's convenience of operation can be further improved.

[Other Embodiments]

In the embodiments described above, when the input device 100 of the present invention is used, the sensor 10 is worn in or on a natural orifice of the body, such as the outer ear etc. Alternatively, the sensor 10 may be worn in or on an artificial orifice which is surgically formed in the body, in addition to natural orifices of the body.

It is expected that the number of people who are disabled or patients who have serious illness will increase with the progress of population aging in the future. In such an aging society, it is important to establish a support system which helps the disabled and patients remain self-reliant without reducing the quality of life (QOL). To solve this problem, the progress of biomedical engineering is desired. A solution to this problem is to use the input device 100 of the present invention. This will be described hereinafter.

Figure 12:
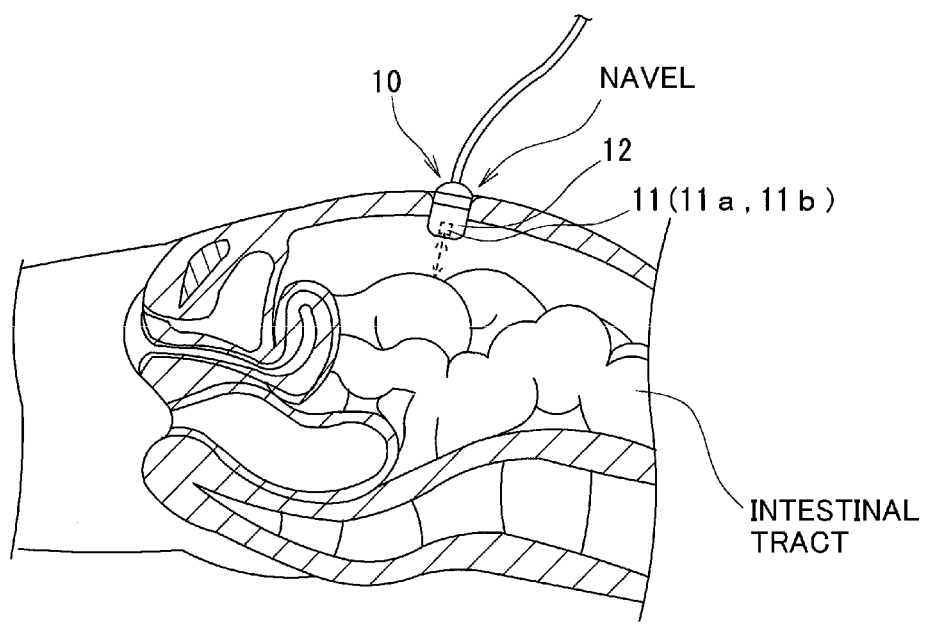
FIG. 12 is a diagram showing a sensor which is worn in an artificial orifice in the vicinity of the navel of a patient in another embodiment.

FIG. 12 is a diagram showing an example artificial orifice surgically formed in the body, specifically, an artificial orifice formed in the vicinity of the navel of a patient by a surgical procedure, such as laparoscopic surgery etc., where the sensor 10 is worn. In this case, the sensor is inserted under the skin, between muscle layers, or under a muscle layer in the vicinity of the navel of the patient. The sensor 10 may basically be one that is similar to the in-ear type sensor of FIG. 3. The sensing device 11 includes the transmitter 11a and the receiver 11b, which are enclosed by the elastic member 12. The elastic member 12, when the sensor 10 is inserted in the artificial orifice, abuts an inner surface of the artificial orifice. Therefore, even after the sensor 10 is inserted to a predetermined position (depth) in the artificial orifice, the sensing device 11 can be moved in the wearer's artificial orifice by the elastic member 12 being bent. On the other hand, even if the shape of the artificial orifice changes, the wearer's internal organs are not substantially moved at high speed. Therefore, the sensing device 11 is allowed to slightly move relative to the internal organs. Although the internal organs, such as the stomach, intestine, etc. move regardless of the wearer's intention, the movement speed of the internal organs is lower than the movement speed of the abdominal muscles around the navel. Therefore, the sensor 10 can distinguish the movement of the abdominal muscles from the movement of the internal organs.

When the sensor 10 is worn in or on an artificial orifice in the vicinity of the navel as in this embodiment, a reduction in the mobility function of the wearer's abdominal muscles can be reduced. This is because there are not many muscles in the vicinity of the navel, and therefore, few muscles are injured when an artificial orifice is surgically formed. The navel of the human body is a scar left from birth. Therefore, even if an artificial orifice is surgically formed in the vicinity of the navel, there is not a significant influence on the outside appearance of the body. Moreover, if an artificial orifice, which is formed by laparoscopic surgery, is directly used for the input device as in this embodiment, it is not necessary to provide an additional artificial orifice.

During measurement, if the wearer's abdominal cavity is filled with a gas, such as $CO_2$ etc., to expand the space of the abdominal cavity, a distance between the sensor 10 and the internal organs can be increased. As a result, the movement of the wearer's abdominal muscles can be reliably sensed. Note that even when the abdominal cavity is not filled with a gas, then if the sensor 10 is appropriately disposed in the artificial orifice, a distance between the sensor 10 and the internal organs can be measured.

In this embodiment, a predetermined action which is intended to operate the external output device 40 is for the wearer to flex and move the abdominal muscles. If a change in the voltage of the sensor signal α which is generated by the sensor 10 in response to the movement of the abdominal muscles satisfies the predetermined criterion β, the controller 20 determines that a change has occurred in the shape of the artificial orifice and transmits a control command (control signal γ) to the external output device 40. Examples of the external output device 40 in this case include a nurse call button, a communication device, etc. which are used in hospitals. Thus, the input device 100 of this embodiment is significantly useful for assisting patients who hardly move their bodies immediately after surgery in communicating.

INDUSTRIAL APPLICABILITY

The input device of the present invention can be combined with any external output device (audio devices, such as a music player etc., video devices, such as a DVD player etc., communications devices, such as a mobile telephone etc., and the like) to provide a preferred wearable computer which allows hands-free operation.

DESCRIPTION OF REFERENCE CHARACTERS

10 SENSOR
11 SENSING DEVICE
11a TRANSMITTER

11b RECEIVER
12 ELASTIC MEMBER
20 CONTROLLER
21 COMPARATOR
22 SIGNAL GENERATOR
30 EXTERNAL STORAGE MEDIUM
40 EXTERNAL OUTPUT DEVICE
100 INPUT DEVICE

The invention claimed is:

1. An input device for outputting a control command or commands to an external output device or devices, comprising:
   an optical sensor configured to be worn in or on a natural orifice of the body and sense a change in a shape of the natural orifice; and
   a controller configured to control the external output device or devices based on a sensor signal or signals from the optical sensor.

2. The input device of claim 1, wherein
the optical sensor is a reflective photosensor or an FGB optical fiber sensor.

3. The input device of claim 1, wherein
the change in the shape of the natural orifice is caused by a predetermined action which is performed by a user wearing the sensor with the intention of operating the external output device or devices.

4. The input device of claim 3, wherein
the natural orifice is an outer ear including an ear canal, and the predetermined action is at least one selected from the group consisting of an action of blinking an eyelid, an action of moving an eyeball, an action of moving a tongue, a masticating action, an action of expanding and contracting a face, and combinations thereof.

5. The input device of claim 1, wherein
the continuous change in the shape of the natural orifice is caused by a predetermined continuous action which is performed by a user wearing the sensor with the intention of continuously operating the external output device or devices.

6. The input device of claim 1, wherein
the controller includes
   a comparator configured to compare the sensor signal or signals received from the sensor with a predetermined criterion indicating a change in a physical quantity, and
   a signal generator configured to generate a control signal for controlling the external output device or devices based on a result of the comparison by the comparator.

7. The input device of claim 6, wherein
the criterion indicating the change in the physical quantity is stored in an external storage medium or in a database provided on a network.

8. The input device of claim 6, wherein
the criterion indicating the change in the physical quantity is (a) that the amount of a change in a voltage is greater than or equal to a predetermined value, (b) that the changed voltage is sustained after the change of the voltage for a predetermined period of time or more, or a combination pattern of at least one (a) and at least one (b).

9. The input device of claim 1, wherein
the sensor includes
   a sensing device configured to be disposed at a predetermined position of the natural orifice, and
   an elastic member configured to abut the natural orifice and enclose the sensing device.

10. A wearable computer comprising:
the input device of claim 1; and
an external output device or devices configured to output information corresponding to a property of the natural orifice.

11. The wearable computer of claim 10, wherein
the natural orifice is an outer ear including an ear canal, and the external output device or devices are an audio device.

12. An input method for outputting a control command or commands to an external output device or devices, comprising:
   sensing a change in a shape of a natural orifice of the body with an optical sensor; and
   controlling the external output device or devices based on the sensed change in the shape of the natural orifice.

13. An input device for outputting a control command or commands to an external output device or devices, comprising:
   an optical sensor configured to be worn in or on an artificial orifice surgically formed in a body and sense a change in a shape of the artificial orifice; and
   a controller configured to control the external output device or devices based on a sensor signal or signals from the optical sensor.

* * * * *

UNITED STATES PATENT AND TRADEMARK OFFICE
CERTIFICATE OF CORRECTION

| | | |
|---|---|---|
| PATENT NO. | : 8,994,647 B2 | Page 1 of 1 |
| APPLICATION NO. | : 13/147919 | |
| DATED | : March 31, 2015 | |
| INVENTOR(S) | : Taniguchi et al. | |

It is certified that error appears in the above-identified patent and that said Letters Patent is hereby corrected as shown below:

In the specification,

Column 8, line 25, please add -- 11 -- between "device" and "(the"

Column 10, line 53, please add -- 20 -- between "controller" and "recognizes"

Column 17, line 62, please add -- 10 -- between "sensor" and "is"

Signed and Sealed this
Eighteenth Day of August, 2015

Michelle K. Lee
*Director of the United States Patent and Trademark Office*